(12) United States Patent
Chen et al.

(10) Patent No.: US 9,101,206 B1
(45) Date of Patent: Aug. 11, 2015

(54) FOLDING TABLE UMBRELLA WAGON

(71) Applicants: Zhaosheng Chen, El Monte, CA (US); Yishun Chen, El Monte, CA (US)

(72) Inventors: Zhaosheng Chen, El Monte, CA (US); Yishun Chen, El Monte, CA (US)

( * ) Notice: Subject to any disclaimer, the term of this patent is extended or adjusted under 35 U.S.C. 154(b) by 0 days.

(21) Appl. No.: 14/316,003

(22) Filed: Jun. 26, 2014

(51) Int. Cl.
*B62B 3/02* (2006.01)
*A47B 3/00* (2006.01)
*B62B 3/00* (2006.01)
*B62B 3/10* (2006.01)

(52) U.S. Cl.
CPC .................. *A47B 3/002* (2013.01); *B62B 3/007* (2013.01); *B62B 3/02* (2013.01); *B62B 3/102* (2013.01); *A47B 2003/004* (2013.01); *B62B 2202/52* (2013.01)

(58) Field of Classification Search
USPC ........................ 280/30, 35, 638, 651, 652, 656
See application file for complete search history.

(56) References Cited

U.S. PATENT DOCUMENTS

| | | | | |
|---|---|---|---|---|
| 5,123,665 A * | 6/1992 | Levy | ................................ | 280/35 |
| 5,306,029 A * | 4/1994 | Kaiser, II | ........................ | 280/30 |
| 5,464,237 A * | 11/1995 | Saporiti | ........................... | 280/30 |
| 5,857,695 A * | 1/1999 | Crowell | ........................ | 280/651 |
| 5,957,352 A * | 9/1999 | Gares | ............................. | 224/401 |
| 6,010,145 A * | 1/2000 | Liu | ............................. | 280/655.1 |
| 6,443,481 B1 * | 9/2002 | Stravitz et al. | ................. | 280/651 |
| 6,491,318 B1 * | 12/2002 | Galt et al. | ...................... | 280/651 |
| 7,731,221 B2 * | 6/2010 | Bess | ............................. | 280/651 |
| 2004/0075248 A1 * | 4/2004 | Elden | ............................. | 280/651 |
| 2009/0230646 A1 * | 9/2009 | Chapman | .................. | 280/47.19 |
| 2011/0074124 A1 * | 3/2011 | Schnarr et al. | .................. | 280/30 |

* cited by examiner

*Primary Examiner* — Frank Vanaman
(74) *Attorney, Agent, or Firm* — Clement Cheng

(57) ABSTRACT

A portable folding table wagon includes a wagon with a wagon body that has a folding wagon frame and wheels connected to a lower portion of the folding wagon frame. The folding wagon frame folds to a deployed position and expands to a stowed position. The folding wagon frame forms a wagon cavity for carrying articles when the folding wagon frame is in deployed position. A table top has a table top surface configured to fit on the folding wagon frame. The portable folding table wagon may also have an umbrella with a pole. A table opening is formed on the table top surface. The table opening is configured to receive the pole. A pole retainer is formed on the folding wagon frame. The pole retainer is configured to receive the pole.

8 Claims, 5 Drawing Sheets

FOLDING TABLE UMBRELLA WAGON

FIELD OF THE INVENTION

The present invention is in the field of foldable tables, more particularly in the field of foldable table wagons.

DISCUSSION OF RELATED ART

A wide variety of different foldable wagons have been implemented in the prior art such as by inventors Zhaosheng Chen and Yishun Chen in U.S. Pat. No. 8,011,686 issued Sep. 6, 2011, entitled Folding Wagon, the disclosure of which is incorporated herein by reference. U.S. Pat. No. 8,011,686 describes that:

- The pull wagon has been used for transporting groceries, small children, gardening supplies and the like for many centuries. Typically, the wagon has a wagon bed with a handle and four wheels. The wagon is multi-functional, pedestrian and generally a neighborhood vehicle. Taking the wagon on camping trips, to the beach or anywhere would generally require loading it into an automobile. Because the traditional pull wagon is not collapsible, the space limitations in a car may sometimes make the transportation of the wagon cumbersome and difficult.
- As an improvement to the traditional pull wagon, a variety of folding versions have been invented. For example, a folding child wagon as described in U.S. Pat. No. 5,957,482 filed Aug. 30, 1996 to Mr. Shorter (the disclosure of which is incorporated herein by reference) provides a wagon with a transversely divided in hinged for folding from a flat position for use to a position which the two bed halves are in face-to-face contact for storage. Furthermore, the removable rail modules may be removable for storage.
- Some wagons are capable of folding into a small compact area. For example, Ritucci shows in U.S. Pat. No. 6,845,991, filed Mar. 17, 2003 a folding wagon that has folding wheels which can be folded for storage such that the entire package appears to fold into a briefcase like module.
- Other inventions such as Banuelos' folding wagon of application Ser. No. 09/732,556, publication number 2003/0025301 having a filing date of Dec. 8, 2000 (the disclosure of which is incorporated herein by reference) provides a net for storing cargo with the net capable of extending between the bottom panel assembly and the upper rail for forming a cargo compartment. A worldwide need for folding wagons has provided a panoply of possibilities. Numerous designs having folding wheels, folding beds, and folding frames have been developed.

The prior art wagon typically has had a folding frame with a pair of leaning bars and defining the foldable frame. The folding frame is typically collapsible to a folded flat position from a generally deployed position. The prior art wagon may have wheels such as sand wheels.

SUMMARY OF THE INVENTION

A portable folding table wagon includes a wagon with a wagon body that has a folding wagon frame and wheels connected to a lower portion of the folding wagon frame. The folding wagon frame folds to a deployed position and expands to a stowed position. The folding wagon frame forms a wagon cavity for carrying articles when the folding wagon frame is in deployed position. A table top has a table top surface configured to fit on the folding wagon frame. The portable folding table wagon may also have an umbrella with a pole. A table opening is formed on the table top surface. The table opening is configured to receive the pole. A pole retainer is formed on the folding wagon frame. The pole retainer is configured to receive the pole.

The table top optionally also has a first table leaf and a second table leaf. The first table leaf and the second table leaf can be hinge connected. The first table leaf and the second table leaf are sized to fit in a table leaf retainer when the first table leaf and the second table leaf are in a table leaf stowed position. The first table leaf and the second table leaf are supported by a wagon stand extension when the first table leaf and the second table leaf are in the table leaf stowed position.

The table leaf retainer is made of a curved tubular metal member that defines a loop for retaining an edge of the table top. The wheels are configured for use on sand. The folding wagon frame further includes a fabric enclosure. The portable folding table wagon further includes an insulated fabric enclosure.

Figure 1:
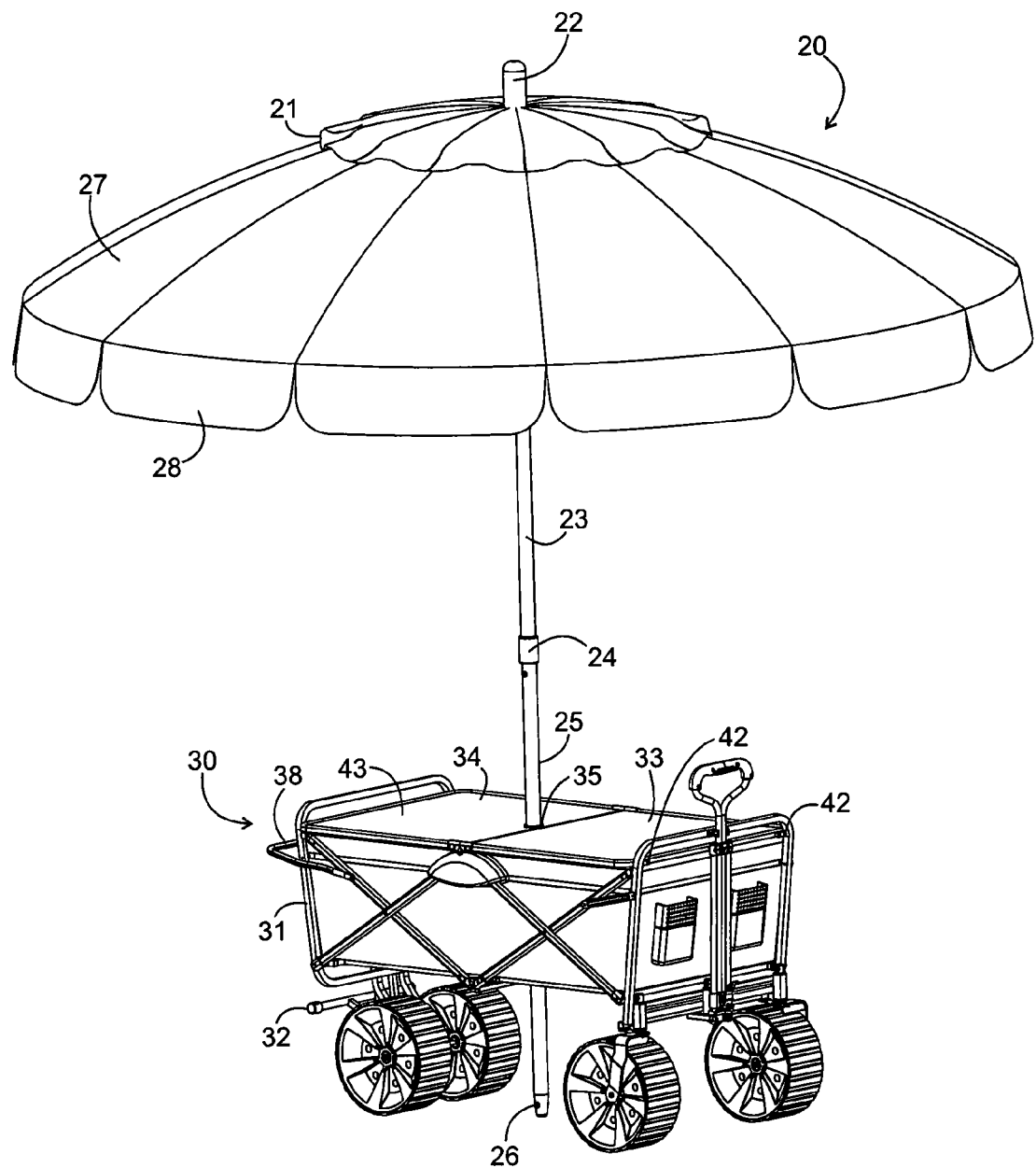
FIG. 1 is a front perspective view of the present invention.
Figure 2:
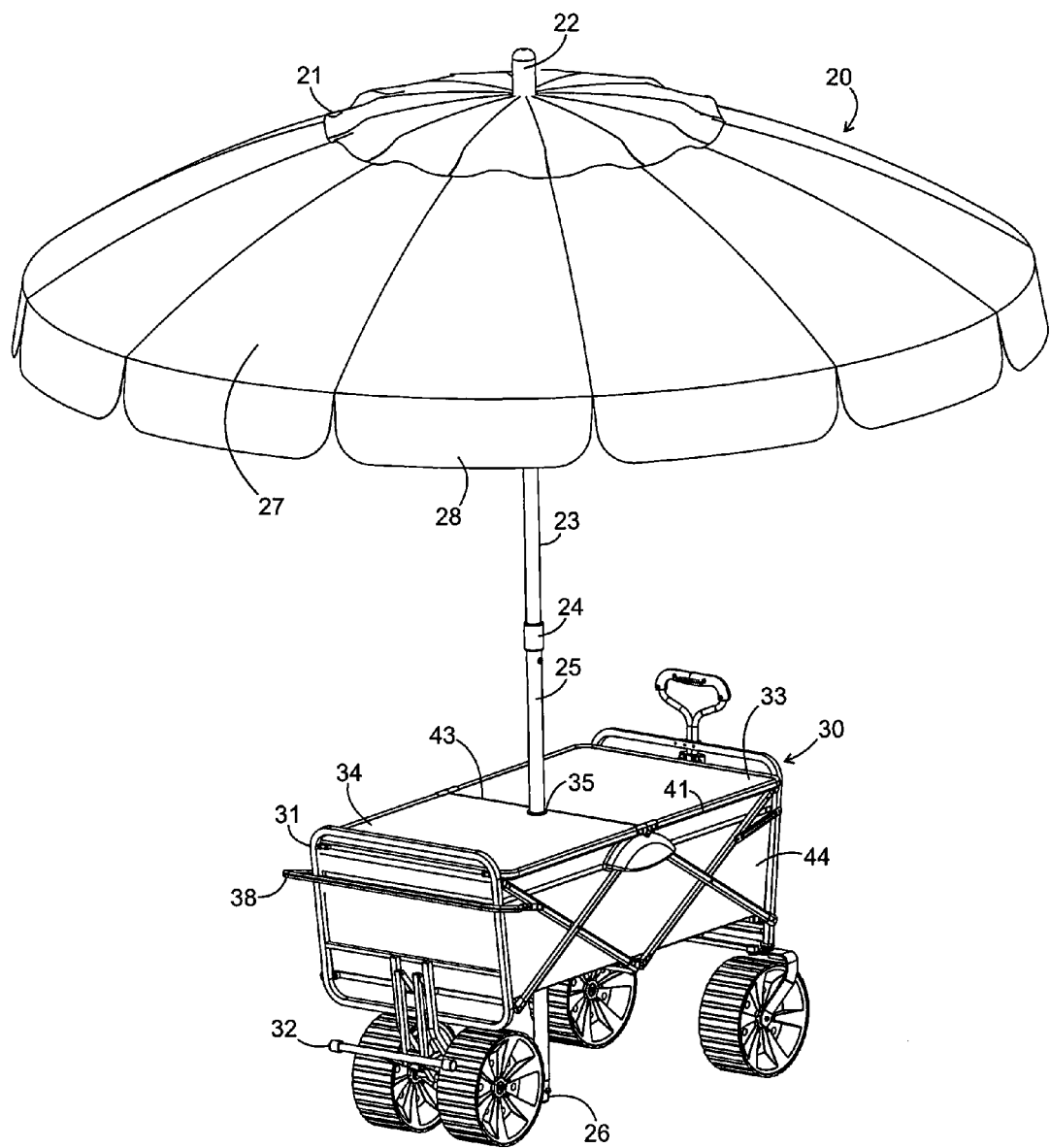
FIG. 2 is a rear perspective view of the present invention.
Figure 3:
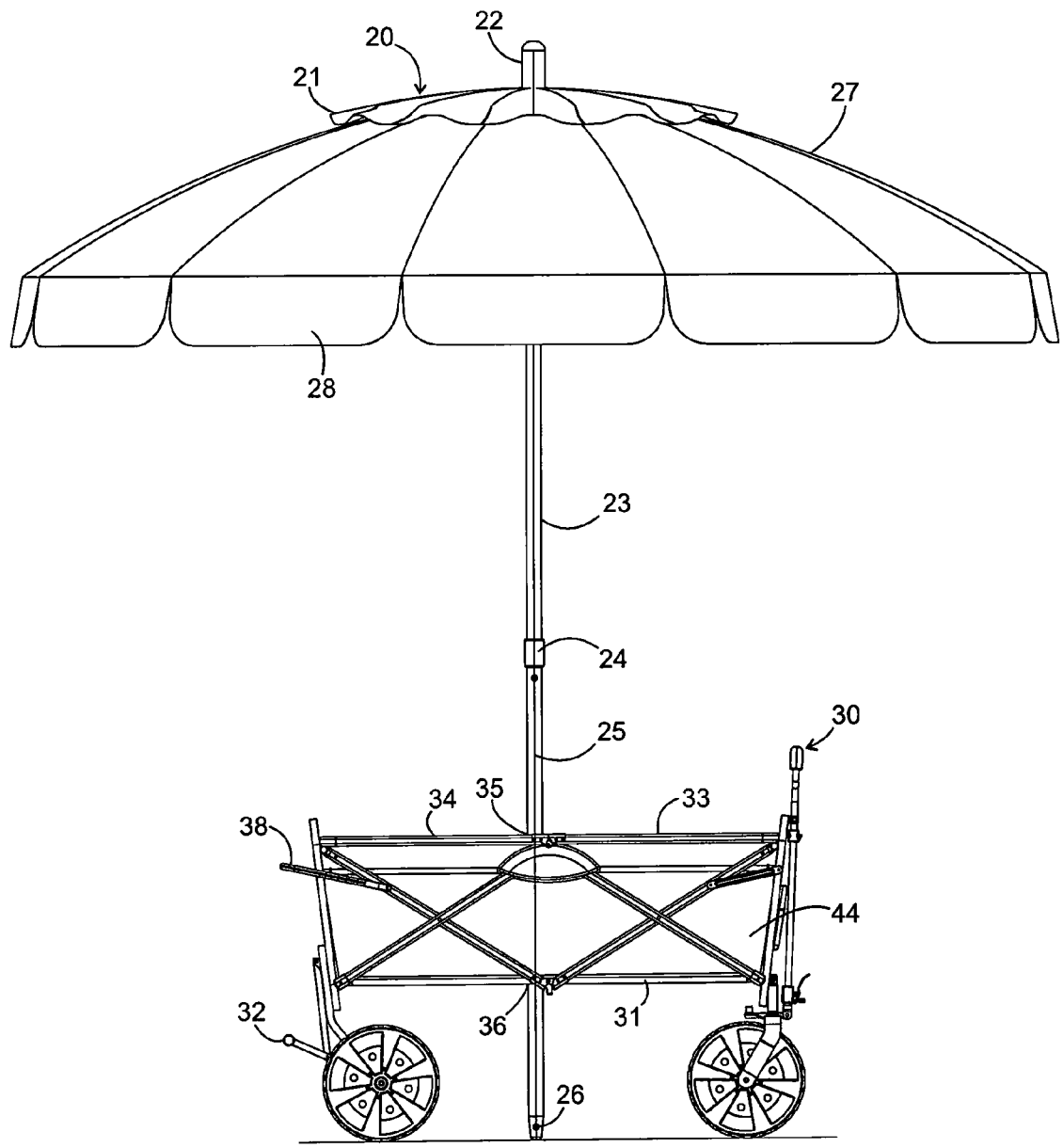
FIG. 3 is a side view of the present invention.
Figure 4:
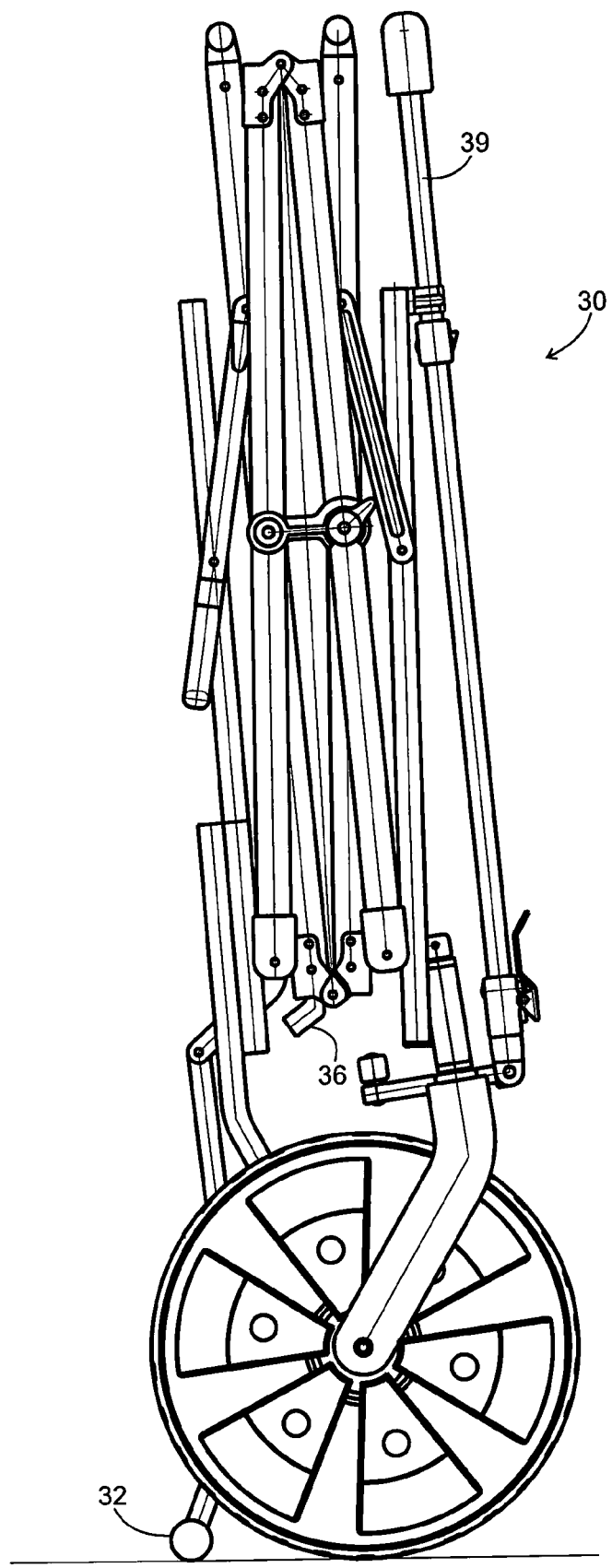
FIG. 4 is a folded side view of the present invention with the fabric enclosure removed to show the wagon frame.
Figure 5:
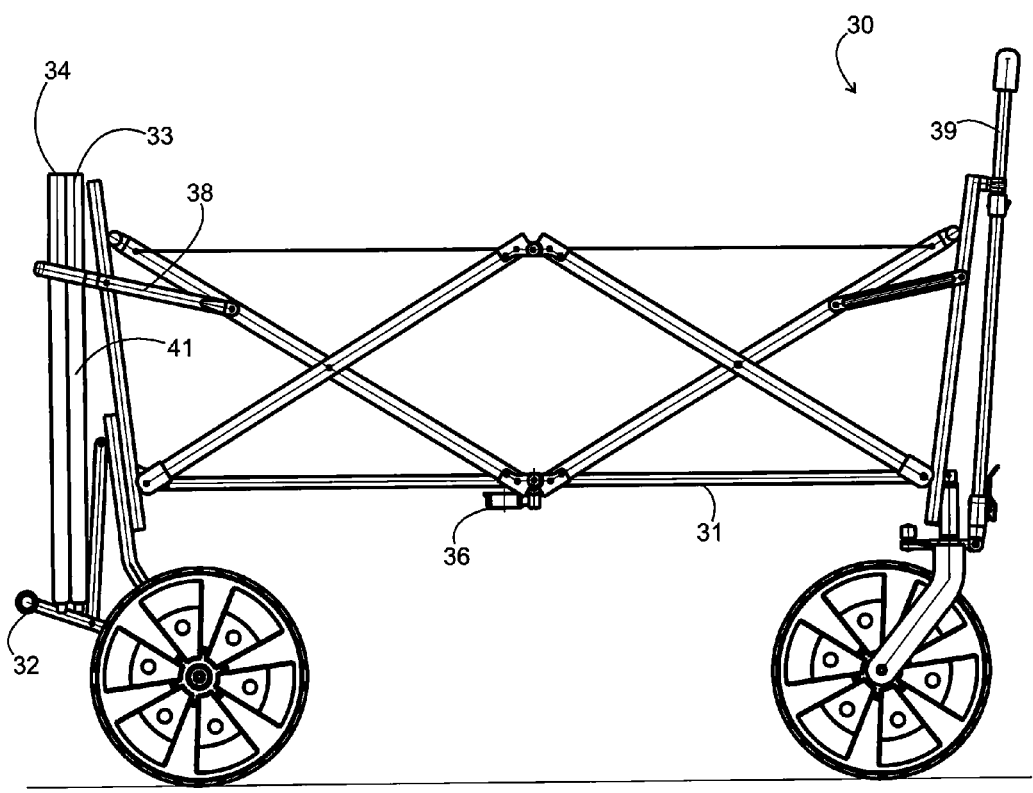
FIG. 5 is a deployed side view of the present invention showing the stowage of the first and second table leaf.

The following call out list of elements can be a useful guide in referencing the elements of the drawings.

20 Umbrella
21 Vent
22 Top Cover
23 Pole Upper Section
24 Pole Connector
25 Pole Lower Section
26 Lower End
27 Shade
28 Umbrella Flap Trim
30 Wagon
31 Wagon Frame
32 Wagon Stand Extension
33 First Table Leaf
34 Second Table Leaf
35 Table Opening
36 Pole Retainer
37 Wheel
38 Table Leaf Retainer
39 Handle
41 Table Rim
42 Table Alignment Protrusions
43 Tabletop Surface
44 Insulated Fabric Enclosure

DETAILED DESCRIPTION OF THE PREFERRED EMBODIMENT

The present invention has a wagon 30 that has a tabletop surface 43 to allow users to eat upon, play board games upon and otherwise frolic in the sun while passing time around a table with family and friends. When the sun becomes too intense, the users can raise the umbrella 20 that is releasable and detachably connected to the wagon frame. When folding, the tabletop folds into a pair of leaves that can be stowed in a slot or pocket. The entire contraption can be folded up and rolled away, or can be deployed and rolled away. The present invention has four modes because it transforms between a folded state, a wagon state, a table state, and a table with wagon state.

The tabletop surface 43 can be decorated such as by screen printing with a chessboard, mahjongg board, backgammon board or any other board game. The umbrella and wagon can have a nonfunctional ornamental design matching the board game assuming such rights can be licensed. The folding wagon frame 31 can include an insulated fabric enclosure 44, attached to the frame by hook and loop straps, can allow users to access cold beers while playing a board game on the tabletop. The fabric enclosure 44 can have a floor and four sidewalls. The fabric enclosure 44 optionally includes insulated fabric lids for enclosing the top. Optionally, the fabric enclosure 44 does not enclose the top of the wagon frame, but rather cooperates with the tabletop surface 43 to enclose contents such as cold drinks or ice within.

The umbrella 20 can be a typical beach umbrella having a vent 21 a top cover 22 covering the upper end of the pole upper section 23. The pole upper section 23 can be connected to a pole connector 24 to a pole lower section 25. The pole lower section 25 can be connected to a lower end 26. The lower end 26 can be formed as a spike for sticking into dirt, a spade for sticking into snow, or a screw head for twisting into sand. The lower end 26 anchors the pole of the umbrella into the ground. The umbrella has a shade 27 that is connected to an umbrella frame. The shade is typically round or square and having sectioned portions of shade. The shade edges can be adorned with umbrella flap trim 28 that provides additional shade.

The wagon 30 has a wagon frame 31 that is foldable between a folded position and a deployed position.

The wagon stand extension 32 allows the wagon to stand upright when the wagon is in folded position. The wagon stand extension 32 is deployed above the ground when the wagon is open, and is touching the ground when the wagon is in a closed position. The wagon stand extension 32 is preferably a crossbar that extends from a wheel truck of a pair of wheels. The wagon stand extension can also be connected to the frame of the wagon frame 31. A first table leaf 33 and a second table leaf 34 are optionally hinged and connected to each other. The first table leaf 33 fits with the second table leaf 34 into a table leaf retainer 38. The table leaf retainer 38 forms a loop having an opening. The loop opening formed by the table leaf retainer 38 retains the first table leaf and a second table leaf in the loop opening. The loop opening retains the upper portion of the table leaf, and the wagon stand extension 32 retains the lower portion of the table leaf so that the table leaf does not fall down. The wagon stand extension 32 supports the table leaf and allows the table leaf to rest upon the wagon stand extension 32.

The table protrusions 42 extend from a side of the table leaf so that the table leaf engages with the wagon stand extension 32 when the table leaf is in stowed position. One or more table leaves can be used independently or in conjunction. One or more table leaves can be connected together by hinges, or can be left loose. The table protrusions 42 also are preferably sized to engage with the wagon frame 31 so that the wagon frame limits the movement of the table leaf in a left to right direction. The protrusions may engage with frame members of the wagon to provide a locking stability. The protrusions may also engage with the frame members of the wagon in interference fit.

Preferably, the table leaf or single piece tabletop has a table opening 35. The table opening 35 receives the umbrella pole. The umbrella pole is preferably retained within the table opening 35 with an elastomeric bushing or grommet. The table opening 35 can be in the second table leaf 34 only near the joint between the first table leaf 33 and the second table leaf 34. The wagon frame also has a pole retainer 36 that retains the umbrella pole at a location below the table opening. The pole retainer 36 provides a lower connection to the portable folding table wagon and the table opening 35 provides an upper connection to the portable folding table wagon.

A plurality of wheels 37 are preferably mounted to the wagon frame 31. A handle 39 is connected to the wagon frame 31. The fabric enclosure mounted to the folding frame is preferably UV coated.

The table is preferably made of metal and has a table rim 41. The table rim extends downward so that it caps over and retains on top of a top portion of the wagon frame 31. The table rim locks onto the wagon frame 31. The table rim connects to the wagon frame so that the table opening 35 can resist lateral movement of the umbrella pole, such as during light winds. The rim preferably extends downwardly from a circumferential periphery of the table top surface 43.

When the user has a the folding table wagon deployed with the umbrella and a tabletop, the user can still fold the tabletop on the folding line between the first table leaf 33 and second table leaf 34.

The detailed description of the preferred embodiment is an example of the invention that is defined by the claims described below. Obvious modifications such as adding pockets on the insulated fabric enclosure outer surface for holding sunglasses can be added to the invention without departing from the scope of the claims.

The invention claimed is:

1. A portable folding table wagon comprising:
   a. a wagon having a folding wagon frame and wheels connected to a lower portion of the folding wagon frame, wherein the folding wagon frame has a deployed position and a stowed position, wherein the folding wagon frame forms a wagon cavity for carrying articles when the folding wagon frame is in deployed position;
   b. front wheels connected to a front portion of the wagon, and rear wheels connected to a rear portion of the wagon, wherein the folding wagon frame folds to decrease a length of the folding wagon frame such that the front wheels move toward the rear wheels when the wagon is folded into the stowed position, wherein a distance between the front wheels and a distance between the rear wheels are different so that the front wheels and the rear wheels become substantially coaxial when the portable folding table wagon folds to a stowed position;
   c. a table top having a table top surface configured to fit on the folding wagon frame, wherein the table top has and has a table rim, wherein the table rim extends downward so that it caps over and retains to a top portion of the wagon frame, wherein the table rim locks onto the wagon frame and extends downwardly from a circumferential periphery of the table top surface;
   d. an umbrella;
   e. a pole attached to the umbrella;
   f. a table opening formed on the table top surface, wherein the table opening is configured to receive the pole;
   g. a pole retainer formed on the folding wagon frame, wherein the pole retainer is configured to receive the pole.

2. The portable folding table wagon of claim 1, wherein the table top further includes: a first table leaf and a second table leaf.

3. The portable folding table wagon of claim 2, wherein the first table leaf and the second table leaf are hingedly connected.

4. The portable folding table wagon of claim 3, wherein the first table leaf and the second table leaf are sized to fit in a table leaf retainer when the first table leaf and the second table leaf are in a table leaf stowed position, wherein the first table leaf and the second table leaf are supported by a wagon stand extension when the first table leaf and the second table leaf are in the table leaf stowed position.

5. The portable folding table wagon of claim 4, wherein the table leaf retainer is made of a curved tubular metal member that defines a loop for retaining an edge of the table top.

6. The portable folding table wagon of claim 1, wherein the wheels are configured for use on sand.

7. The portable folding table wagon of claim 1, wherein the folding wagon frame further includes a fabric enclosure.

8. The portable folding table wagon of claim 1, wherein the folding wagon frame further includes an insulated fabric enclosure.

\* \* \* \* \*